United States Patent
Schulz et al.

(10) Patent No.: US 9,539,533 B2
(45) Date of Patent: Jan. 10, 2017

(54) CYCLONE FILTER DEVICE

(71) Applicant: MANN+HUMMEL GMBH, Ludwigsburg (DE)

(72) Inventors: Franziska Schulz, Schifferstadt (DE); Manfred Winter, Bad Rappenau (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 180 days.

(21) Appl. No.: 14/484,653

(22) Filed: Sep. 12, 2014

(65) Prior Publication Data

US 2015/0068169 A1   Mar. 12, 2015

(30) Foreign Application Priority Data

Sep. 12, 2013   (DE) .................. 10 2013 015 052

(51) Int. Cl.
| | | |
|---|---|---|
| *B01D 50/00* | (2006.01) | |
| *B01D 45/12* | (2006.01) | |
| *B01D 45/16* | (2006.01) | |
| *B01D 46/00* | (2006.01) | |
| B01D 46/24 | (2006.01) | |
| A47L 9/16 | (2006.01) | |

(52) U.S. Cl.
CPC ............ *B01D 50/002* (2013.01); *B01D 45/12* (2013.01); *B01D 45/16* (2013.01); *B01D 46/0045* (2013.01); *B01D 46/24* (2013.01); *A47L 9/1608* (2013.01); *B01D 46/2411* (2013.01)

(58) Field of Classification Search
CPC ....... B01D 45/16; B01D 50/002; B01D 45/12; B01D 46/2411; A47L 9/1608
See application file for complete search history.

(56) References Cited

U.S. PATENT DOCUMENTS

| | | | | |
|---|---|---|---|---|
| 2,696,275 A | * | 12/1954 | Pring .................... | B01D 45/16 261/112.1 |
| 2,918,139 A | * | 12/1959 | Silverman ............... | B04C 5/103 55/339 |
| 2,936,043 A | * | 5/1960 | Armstrong ............... | B04C 5/06 55/416 |
| 3,420,040 A | * | 1/1969 | Neely ...................... | B04C 5/06 55/346 |
| 3,425,192 A | * | 2/1969 | Davis .................... | A47L 9/1625 209/711 |
| 3,740,932 A | * | 6/1973 | Borsheim ............. | B01D 45/12 55/394 |
| 3,769,781 A | * | 11/1973 | Klein .................... | F22B 37/327 122/34 |
| 3,988,132 A | | 10/1976 | Oranje | |
| 4,162,906 A | * | 7/1979 | Sullivan .................... | B04C 3/00 210/512.1 |
| 4,279,624 A | * | 7/1981 | Wilson ................... | B01D 45/16 209/710 |

(Continued)

FOREIGN PATENT DOCUMENTS

DE         25 00 987 A1     7/1975
DE         19914674 C1     12/2000

*Primary Examiner* — Dung H Bui
(74) *Attorney, Agent, or Firm* — James Hasselbeck

(57) ABSTRACT

A filter device for cleaning a gas flow has a hollow cylindrical pre-separator on whose outer side guide vanes are arranged. At least a portion of the guide vanes is provided with a rib that protrudes over the guide vane surface.

9 Claims, 2 Drawing Sheets

(56) References Cited

U.S. PATENT DOCUMENTS

| | | | | |
|---|---|---|---|---|
| 4,311,494 | A * | 1/1982 | Conner | B01D 45/16 55/394 |
| 4,420,314 | A * | 12/1983 | Barron, Jr. | B04C 5/06 55/436 |
| 5,893,937 | A * | 4/1999 | Moessinger | B01D 46/0004 55/385.3 |
| 6,610,115 | B1 * | 8/2003 | Hegemann | B04C 5/06 55/315 |
| 6,837,912 | B1 * | 1/2005 | Heumann | B04C 5/103 55/424 |
| 7,842,113 | B2 * | 11/2010 | Albrecht | F22B 37/322 55/348 |
| 2007/0175185 | A1 * | 8/2007 | Kim | B01D 50/002 55/337 |
| 2010/0154367 | A1 * | 6/2010 | Luo | A47L 5/362 55/337 |
| 2011/0203234 | A1 * | 8/2011 | Wolsfeld | B01D 45/08 55/307 |
| 2014/0053521 | A1 * | 2/2014 | Muenkel | B01D 46/0021 55/489 |

* cited by examiner

CYCLONE FILTER DEVICE

CROSS-REFERENCE TO RELATED APPLICATION

This application claims the benefit of German patent application No. 102013015052.3, filed in Germany on Sep. 12, 2013, the entire contents of the aforesaid German patent application being incorporated herein by reference.

TECHNICAL FIELD

The invention relates to a cyclone filter device for cleaning a gas flow.

BACKGROUND

A cyclone filter device for cleaning a gas flow such as, for example, the intake air of a combustion engine is described in EP 1 364 696 A1. In a housing embodied as a cyclone, the filter device has a hollow cylindrical pre-separator that engages around a likewise hollow cylindrical filter element. Arranged in a distributed manner on the lateral surface of the pre-separator are guide vanes, each consisting of two guide vane regions arranged at an angle to each other that support pre-separation of coarse contaminants in the gas flow. The guide vanes bring about a deflection and acceleration of the introduced gas flow, including of the contaminants contained therein. The contaminants separated off are discharged via a discharge opening in the housing, and after passing through the pre-separator, the gas flow is conducted radially from outside to inside through the filter element, from which the cleaned gas is discharged axially.

SUMMARY OF THE INVENTION

The invention is based on the object of providing, by simple structure means, a cyclone filter device for cleaning a gas flow that is versatile and has a good cleaning effect.

The invention relates to a cyclone filter device for cleaning a gas flow, which cyclone filter device functions as a cyclone separator and has, in a housing, a hollow cylindrical pre-separator on whose outer side guide vanes are arranged in a distributed manner over the periphery, which guide vanes are particularly designed to set a gas flow in a screw-like or spiral flowing motion or to conduct a screw-like or spiral gas flow or to amplify a screw-like or spiral flowing motion. The gas flow is preferably introduced radially or tangentially into the pre-separator and strikes the guide vanes arranged on the outer periphery of the pre-separator, whereby the gas flow preferably undergoes deflection and acceleration, which leads to the separating-off of coarse contaminants such as dirt and dust particles as well as water droplets. The contaminants are thrown particularly tangentially outward and can optionally be discharged from the housing of a filter device via a discharge opening. After passing through the pre-separator, the gas flow is then expediently fed to a filter element that is also arranged in the housing of the filter device, preferably within the cylindrical pre-separator. After filtration of the gas flow in the filter element, the cleaned gas is discharged. Optionally, the filter element can also be hollow and cylindrical like the pre-separator and be engaged around by the pre-separator. In this embodiment, the filter element is flowed through radially from outside to inside, the discharging of the cleaned gas flow occurring axially out of the interior space of the filter element.

The hollow cylindrical pre-separator can be made of metal or sheet metal; optionally, a plastic material, particularly thermoplastic material used in the injection-molding process, can also be considered. The introduced gas arrives at the radially outside lateral surface of the pre-separator and can, after discharging of the coarse contaminants, flow over one or both front sides of the pre-separator to the raw side of the filter element. Expediently, an annular space is located between the pre-separator and the raw side of the filter element into which the gas flows from whence the gas flows through the filter element.

Optionally, the pre-separator has a different axial length than the filter element, particularly a shorter length. The raw side of the filter element is therefore engaged around only partially by the pre-separator, so that flow against the raw side of the filter element is facilitated.

At least a portion of the guide vanes is provided with a rib that protrudes over the guide vane surface. The rib extends at least approximately in the tangential direction and has the function of promoting flow and pre-separation. Depending on the design of the inlet, this can be achieved in that the impinging gas flow is accelerated more strongly or caused to rotate, thus also improving the separating-off of the coarse contaminants in the gas flow. The flow-promoting function can also be the result of an evening-out of the flow or reduction of turbulence.

Optionally, the rib on the guide vane is given the task of receiving or holding a plug that is inserted between adjacent guide vanes in order to reduce the overall flow cross section between the guide vanes. In the event of small pressure differences, and while maintaining the total volumetric flow between the inflow and outflow side of the filter device, the introduction of one or more plugs can be advantageous, since greater flow velocities into the remaining open cross sections between adjacent guide vanes are achieved through the reduction in cross section. This embodiment thus makes it possible to use a common pre-separator for different-sized cyclone filter devices and to adapt to the respective flows through the optional introduction of the stoppers between a portion of the open cross sections between adjacent guide vanes, with another portion of the open cross sections between adjacent guide vanes remaining open. No further changes to the pre-separator are required. The plugs are held in a sufficiently secure manner by the ribs on the guide vanes.

The plug is made of polyurethane, for example, and can be cast into the intermediate space between adjacent guide vanes. By virtue of the rib on the guide vane that extends in the tangential direction, unintentional detachment of the plug radially outward is rendered more difficult.

In principle, it is sufficient to provide exactly one rib on a guide vane that is raised above the guide vane surface. It is also possible, however, to arrange several ribs on a guide vane that can be located either on opposing sides of the guide vane or on the same side.

According to another expedient embodiment, the rib is embodied in a straight line on the guide vane. In relation to the cylindrical lateral surface of the pre-separator, it extends at least approximately in the tangential direction. In principle, angular deviations from the tangential direction can also be considered, such as an angular deviation of up to 20 degrees, for example.

According to another embodiment, the rib is bent or curved. For example, the rib can extend concentrically to the outer lateral surface of the pre-separator. In this embodiment as well, the rib extends—at least in segments or at a tangent that is placed on the rib—in the tangential direction.

According to another advantageous embodiment, each guide vane is provided with at least one rib on the outer lateral surface of the pre-separator. Alternatively, however, it is also possible for only a portion of the guide vanes to have a rib, for example only every other guide vane.

According to another advantageous embodiment, the ribs are all expediently located on the same side of the guide vane. These are preferably arranged adjacent to a front side of the pre-separator, the ribs advantageously being located on the side of the guide vane that faces away from the adjacent front side of the pre-separator. The introduced gas flow strikes the guide vanes, is deflected in an accelerated manner through the intermediate spaces between adjacent guide vanes, and can then flow, after the discharging of coarse contaminants, over the front side of the pre-separator to the raw side of the filter element.

According to another advantageous embodiment, the guide vanes are distributed over the entire periphery of the pre-separator. Alternatively, it is also possible for the guide vanes to extend only over a portion of the periphery of the pre-separator.

According to another advantageous embodiment, the rib is spaced apart from the radially outer side of the guide vanes. Here, it can be expedient to arrange the rib in the middle of the guide vane so that the distance to the radially outer lateral surface of the pre-separator on the one hand and to the radially outside edge of the guide vane on the other hand is at least approximately equal in the radial direction.

BRIEF DESCRIPTION OF THE DRAWINGS

Additional advantages and expedient embodiments can be learned from the other claims, the description of the figures and the drawings.

In the figures, same components are provided with the same reference symbols.

DESCRIPTION OF THE DISCLOSURE

Figure 1:
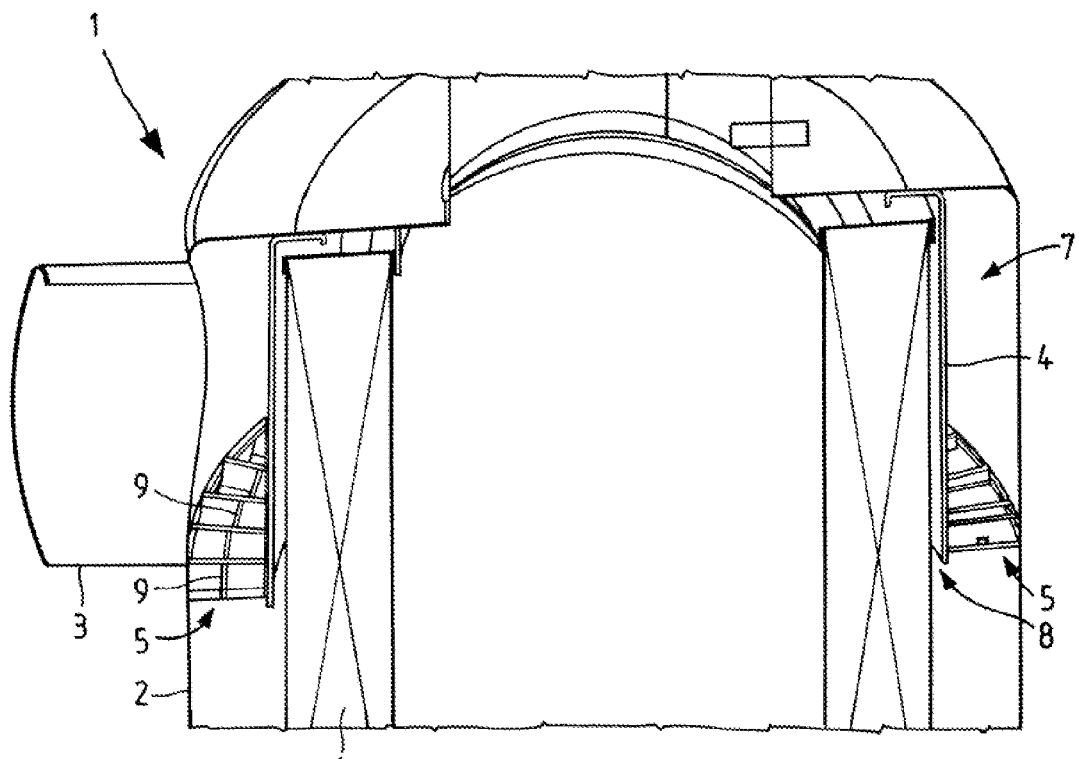
FIG. 1 shows a section longitudinally through a cyclone filter device with the hollow cylindrical pre-separator on whose outer side guide vanes are arranged, and with a likewise hollow cylindrical filter element that is engaged around by the pre-separator.

FIG. 1 shows a cyclone filter device 1 for cleaning a gas flow, particularly for cleaning the combustion air that is fed to the cylinders of a combustion engine. The filter device 1 has a housing 2 embodied as a cyclone that is hollow and cylindrical and has a lateral inlet connector 3 over which the uncleaned gas flow flows radially or tangentially into the housing 2. Arranged in the housing 2 is a hollow cylindrical pre-separator 4 on whose outer periphery adjacent to a front side of the pre-separator are arranged several guide vanes 5 in a distributed manner over the periphery. Moreover, a likewise hollow cylindrical filter element 6 is received in the housing 2, which filter element 6 is arranged within the pre-separator 4 and engaged around by same. The filter element 6 is flowed through radially from outside to inside by the gas to be cleaned. After filtration, the cleaned gas is discharged from the inner space of the filter element 6.

The pre-separator 4 has a smaller outer diameter than the inner diameter of the filter housing 2, so that an annular space is formed between the wall of the housing 2 and the pre-separator 4 in which the inflowing, uncleaned gas can disperse. The pre-separator 4 is preferably made of plastic, particularly injection-molded thermoplastic plastic, sheet metal or metal. The guide vanes 5 are located adjacent to the lower front edge of the pre-separator 4 and border the annular space 7 axially into which the uncleaned gas flows via the inlet connector 3. The gas in the annular space 4 undergoes swirling and flows through the intermediate spaces between adjacent guide vanes 5 that extend annularly adjacent to the lower front side of the pre-separator 4. Upon flowing through the intermediate spaces between the guide vanes 5, the gas undergoes deflection and acceleration, whereby coarse contaminants that are being carried along in the gas flow, for example dirt particles or water droplets, are thrown tangentially outward and thus discharged from the gas flow.

As it continues to flow, the gas can flow into an inner annular space 8 that is formed between the inner side of the pre-separator 4 and the outer lateral surface of the filter element 6 that forms the raw side of the filter element. The gas can flow radially from outside to inside from the inner annular space 8 through the filter element 6 and is then discharged axially from the inner space of the filter element 6.

Figure 2:
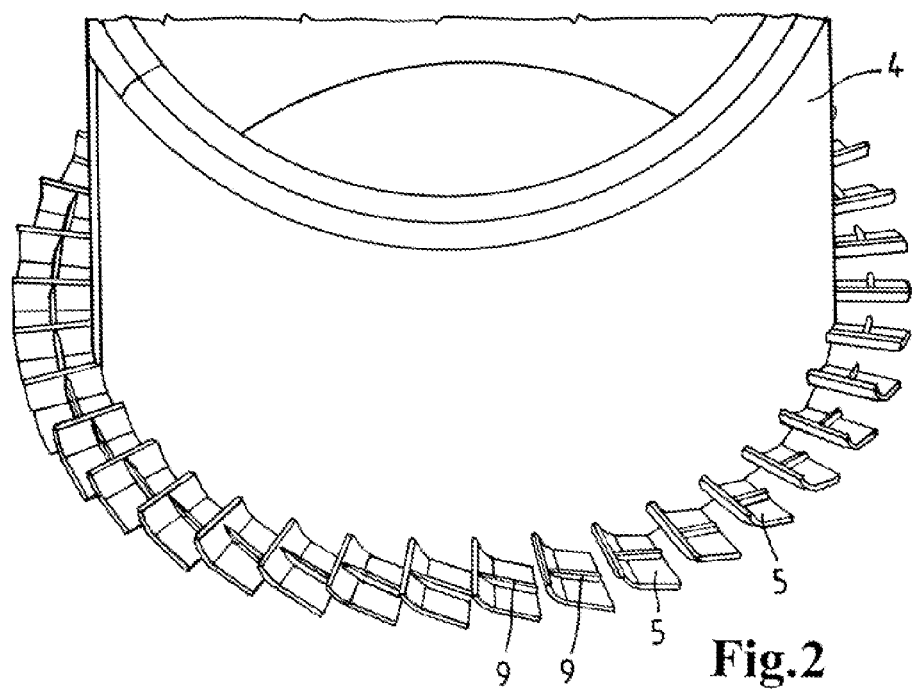
FIG. 2 shows the pre-separator in a perspective view, each guide vane of the pre-separator being provided with a rib.

FIG. 2 shows a perspective representation of the pre-separator from the exemplary embodiment according to FIG. 1. Each guide vane 5 bears a rib 9 which, when seen in the radial direction, is located about in the middle of the guide vane 6 and extends at least approximately in the tangential direction. The rib 9 is embodied in a straight line and located on the side facing away from the lower front side of the pre-separator that is arranged adjacent to the guide vanes 5. The ribs 9 therefore face toward the outer annular space 7 between the housing wall of the housing 2 and the outer lateral surface of the pre-separator 4. The ribs 9 protrude over the guide vane surface of the guide vanes 5 and bring about improved flow, particularly a uniform and/or less turbulent flow of the particle-loaded gas flowing through the intermediate spaces between adjacent guide vanes 5.

The guide vanes 5 can also optionally be carriers of a plug that seals the intermediate space between adjacent guide vanes. The plug is made of polyurethane, for example, and is cast into the intermediate space between adjacent guide vanes 5. This can be expedient in cases in which only a relatively small difference in pressure exists between the raw and clean side of the filter device. Not all of the intermediate spaces are sealed, however, but rather only a portion of the intermediate spaces, which leads to an increase in flow velocity through the remaining open intermediate spaces. The ribs 9 on the guide vanes that receive a plug provide better seating and stronger adhesion of the plug on the respective guide vane 5. As described previously, the ribs 9 on the guide vanes 5 without a plug provide for flow optimization.

The ribs 9 are embodied in a straight line and extend over the entire length—when seen in the circumferential direction—of the guide vanes 5.

Figure 3:
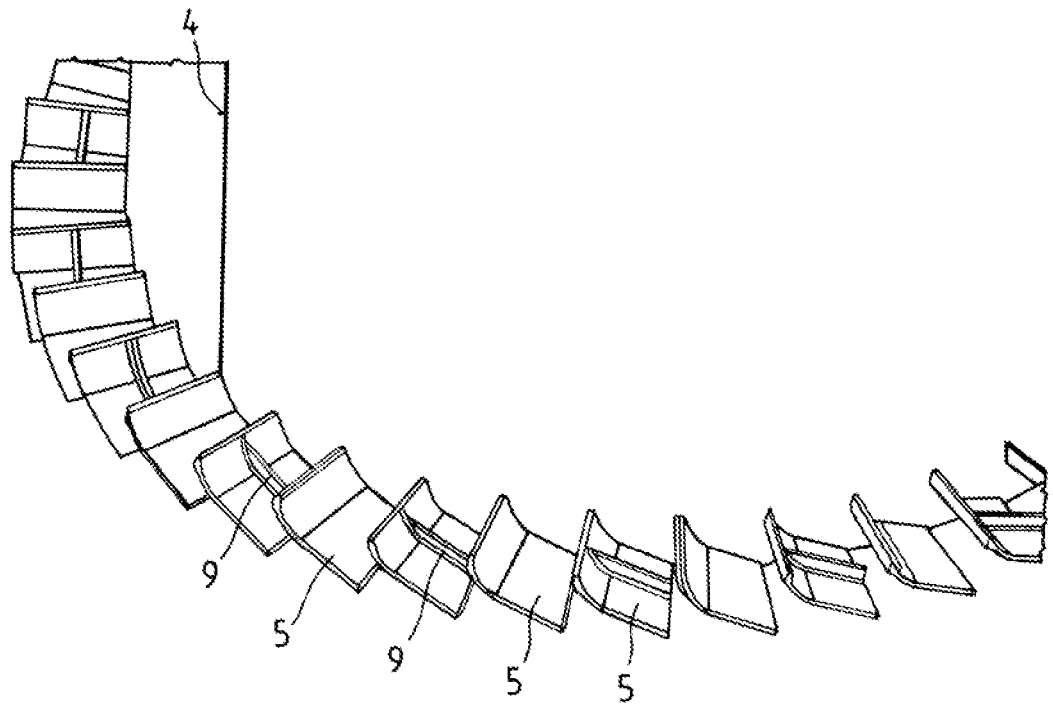
FIG. 3 shows a pre-separator in which only every other guide vane is provided with a rib.

FIG. 3 shows a modified embodiment of a pre-separator 4 with a ring with guide vanes 5 which, unlike the previous exemplary embodiment, are provided only partially with a rib 9. Only every other guide vane 5 bears a rib 9, while the remaining guide vanes have no rib. In some circumstances, this can be sufficient in order to achieve the desired promotion of the flow and improved separation efficiency.

Figure 4:
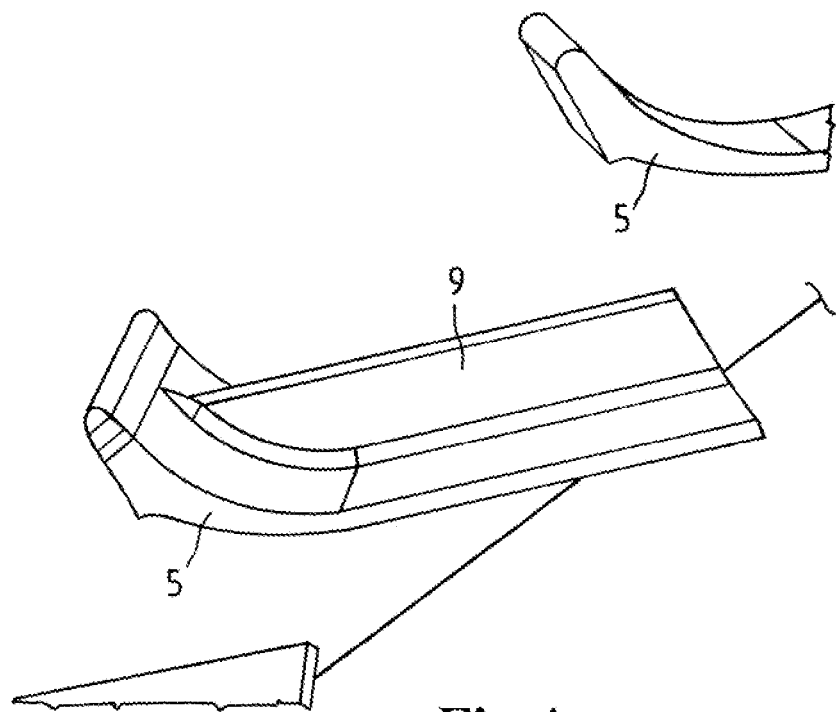
FIG. 4 shows an enlarged view of two guide vanes of the pre-separator according to FIG. 3.

As can be seen in FIG. 4, the rib 9 on the guide vane 5 is embodied as a partition wall arranged in the middle and extends over the entire length of the guide vane 5. The guide vane 5 is embodied as a straight line in segments and also possesses a curved segment in which the rib 9 ends. The curved segment of the guide vane 5 is higher than the rib 9.

We claim:

1. A cyclone filter device for cleaning a gas flow, the cyclone filter device comprising:
    a hollow annular filter element;
    an axially elongated cylindrical pre-separator having a hollow interior, an axial upper front side and axial lower front side at opposing axial ends of the pre-separator;
    guide vanes secured onto a radially outer circumferential surface of the cylindrical pre-separator, the guide vanes projecting radially outwardly away from the radially outer circumferential surface of the cylindrical pre-separator;
    wherein the guide vanes are spaced and distributed around circumference of the circumferential outer surface of the cylindrical pre-separator;
    wherein each guide vane of the guide vanes has a flow guiding surface on an axial side of the guide vain upon which incoming gas flow strikes the guide vane and is then deflected in a tangential direction, caused to rotate and accelerate on the guide surface;
    wherein the flow guiding surface extends from an incoming flow edge on an incoming flow side of the guide vane to an outgoing flow edge where deflected rotating gas flow leaves the guide vane;
    wherein at least a portion of the guide vanes are provided with an axially projecting rib formed on the flow guiding surface extending between the incoming flow edge and the outgoing flow edge, the rib extending at least approximately in the tangential direction on the flow guiding surface and projecting axially away from the guide vane towards the incoming gas flow, protruding over the flow guiding surface;
    wherein the rib is spaced apart from and arranged in a central region between radially inner and radially outer edges of the at least a portion of the guide vanes;
    wherein the rib extends in a straight line in tangential orientation or curved and in concentric orientation to pre-separator;
    wherein the axially elongated cylindrical pre-separator radially surrounds a radial outer side of the filter element and is spaced away from the radial outer side of the filter element forming an inner annular space between the pre-separator and the filter element, the inner annular space permitting flow to reach a portion of the filter element surrounded by the pre-separator;
    wherein the pre-separator and filter element are engaged together and installed together into the housing of the filter device.

2. The filter device as set forth in claim 1, wherein the guide vanes are arranged adjacent to the axial upper front side or the axial lower front side of the pre-separator.

3. The filter device as set forth in claim 2, wherein the rib and the flow guiding surface are arranged on a side of the guide vanes facing away from the nearest one of the upper front side and axial lower front side.

4. The filter device as set forth in claim 1, wherein for the portion of the guide vanes provided with the rib, the rib of each guide vane are arranged in a same axial side of the guide vanes.

5. The filter device as set forth in claim 1, wherein all guides vanes are provided with the rib.

6. The filter device as set forth in claim 1, wherein the rib extend at least approximately over an entire length of the guide vanes from the incoming flow edge on an incoming flow side of the guide vane to the outgoing flow edge.

7. The filter device as set forth in claim 1, wherein the pre-separator engages around a filter element that is received together with the pre-separator in a housing of the filter device.

8. The filter device as set forth in claim 1, wherein only a portion of the guide vanes are provided with the rib.

9. The filter device as set forth in claim 1, wherein the guide vanes are secured only on the radially inner edges of the guide vanes.

* * * * *